Dec. 3, 1929.  W. B. FRANKENSTEIN  1,737,754
DISHPAN
Filed March 28, 1928
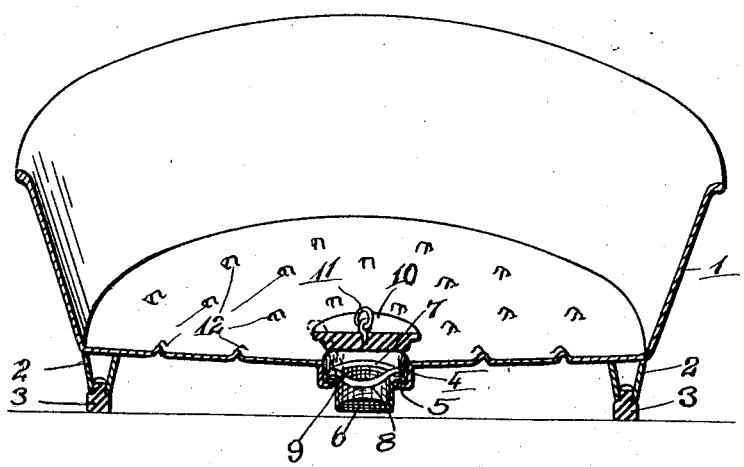
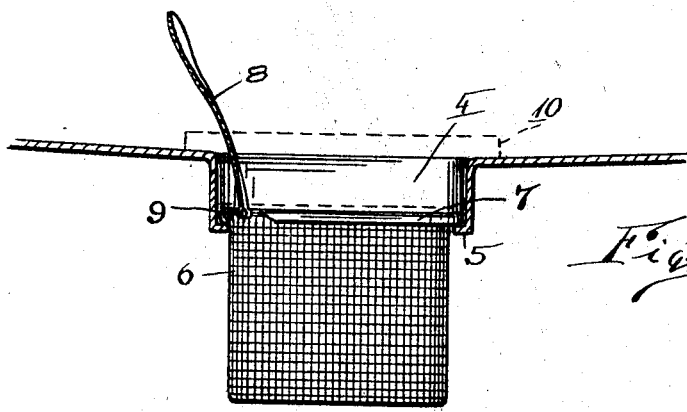
Inventor
William B. Frankenstein
By Frank Keiper.
Attorney Patented Dec. 3, 1929

1,737,754

UNITED STATES PATENT OFFICE

WILLIAM B. FRANKENSTEIN, OF ROCHESTER, NEW YORK

DISHPAN

Application filed March 28, 1928. Serial No. 265,385.

This invention relates to dish pans and has for its object to provide an improved construction of a dish pan having an outlet in which a strainer is removably mounted so that when the water is drained out of the pan any solid matter deposited in the pan by the dishes washed therein is automatically collected in the strainer so that it can be removed with the strainer and kept out of the sewer.

Another object of this invention is to provide the dish pan with suitable legs that hold the pan elevated from the bottom of the sink to provide room for the strainer attachment and allow the water from the strainer to readily pass out into the sink and the outlet of the sink.

A further object of this invention is to provide the legs of the dish pan with rubber pads so that the sink will not be scratched by them.

These and other objects of this invention will be fully illustrated in the drawing, described in the specification and pointed out in the claim at the end thereof.

In the accompanying drawing:

Figure 1 is a partial sectional and perspective view of the improved dish pan.

Figure 2 is an enlarged sectional view of a portion of the bottom of the dish pan and the strainer supported thereby.

In the figures of the drawing like reference numerals indicate like parts.

In the drawing reference numeral 1 indicates the dish pan having feet 2 thereunder, preferably four in number with rubber cushions 3 in the bottom thereof by which feet the dish pan is held elevated from the bottom of the sink. The bottom of the dish pan is sloped toward the center so that it will readily drain toward the center and in the center is placed a cup shaped depression or sleeve 4 having an inturned flange 5 on the bottom thereof. In this cup rests a strainer 6 which has a rim 7 thereon projecting outwardly therefrom which rests on the flange 5 and by which it is supported. A handle 8 is provided by which the strainer may be lifted out of the dish pan for the purpose of removing the strainer to clean it. This handle is pivoted at 9 and folds down to the position shown in Figure 1 where it is out of the way. It is raised up to the position shown in Fig. 2 when it is desired to remove the strainer from the pan. The handle is narrow so as not to interfere with the drainage of the pan.

To hold the water in the dishpan while the dishes are being washed, a stopper 10 is used which makes a close fit with the opening in the bottom of the dish pan. This stopper is provided with a handle 11 by which it may be raised up from the bottom of the pan to uncover the drainage opening and permit the water to flow out.

The pan and the strainer are so arranged that when the plug 10 is removed, the water will flow out through the sides of the strainer into the sink and the strainer will catch any solid matter that is in the water and prevent it from going into the sewer.

Distributed over the bottom of the dish pan and suitably spaced from each other are the lugs 12, 12 which are struck up from the bottom and serve as stops against which the edges of the dishes can rest so that they will rest angularly in the dish pan and not slide down to the center or rest flat on the bottom of the pan.

I claim:

A dish pan having a bottom with an opening therein, a sleeve forming a downward extension of said opening, a supporting ledge in said sleeve below the bottom of the pan, a supporting flange adapted to be supported in said sleeve by said supporting ledge, a cylindrical strainer depending from said supporting flange and held suspended below the bottom of said dish pan, a handle mounted to swing on a horizontal axis on said supporting flange and adapted to either extend horizontally over said strainer and below the bottom of the pan whereby a stopper may be telescoped into said opening and sleeve, or to extend upwardly to project above the opening in the bottom of said dish pan for convenience in removal of the strainer.

In testimony whereof I affix my signature.

WILLIAM B. FRANKENSTEIN.